US006242873B1

United States Patent
Drozdz et al.

(10) Patent No.: US 6,242,873 B1
(45) Date of Patent: Jun. 5, 2001

(54) METHOD AND APPARATUS FOR ADAPTIVE HYBRID VEHICLE CONTROL

(75) Inventors: Piotr Drozdz; Andrew Zettel, both of Vancouver (CA)

(73) Assignee: Azure Dynamics Inc. (CA)

( * ) Notice: Subject to any disclaimer, the term of this patent is extended or adjusted under 35 U.S.C. 154(b) by 0 days.

(21) Appl. No.: 09/494,812

(22) Filed: Jan. 31, 2000

(51) Int. Cl.$^7$ .................................................. H02P 1/00
(52) U.S. Cl. ..................... 318/139; 318/430; 180/65.1; 180/65.2; 180/65.3; 180/65.4
(58) Field of Search ........................ 318/139; 180/65.1, 180/65.2, 65.3, 65.4

(56) References Cited

U.S. PATENT DOCUMENTS

| | | |
|---|---|---|
| 4,187,436 | 2/1980 | Etienne . |
| 5,264,764 | 11/1993 | Kuang . |
| 5,318,142 | 6/1994 | Bates et al. . |
| 5,550,445 | 8/1996 | Nii . |
| 5,583,844 * | 12/1996 | Wolf et al. ............................ 364/423 |
| 5,589,743 * | 12/1996 | King ..................................... 318/139 |
| 5,650,931 | 7/1997 | Nii . |
| 5,656,921 | 8/1997 | Farrall . |
| 5,698,955 | 12/1997 | Nii . |
| 5,785,137 * | 7/1998 | Reuyl .................................. 180/65.2 |
| 5,786,640 | 7/1998 | Sakai et al. . |
| 5,788,004 | 8/1998 | Friedmann et al. . |
| 5,804,947 | 9/1998 | Nii et al. . |
| 5,820,172 | 10/1998 | Brigham et al. . |
| 5,847,520 * | 12/1998 | Theurillat et al. ................... 318/139 |
| 5,867,009 * | 2/1999 | Kiuchi et al. ............................ 322/16 |
| 5,898,282 * | 4/1999 | Drozdz et al. ....................... 318/139 |
| 5,939,794 * | 8/1999 | Sakai et al. ............................. 290/40 |
| 6,127,813 * | 10/2000 | Tamagawa ............................. 322/16 |
| 6,135,314 * | 9/2000 | Graf et al. .............................. 701/53 |

* cited by examiner

Primary Examiner—Robert E. Nappi
Assistant Examiner—Tyrone Smith
(74) Attorney, Agent, or Firm—Townsend and Townsend and Crew LLP

(57) ABSTRACT

A method and apparatus for controlling a hybrid vehicle having an auxiliary power unit, at least one energy storage device, at least one electric drive motor for traction, and a controller with associated memory. The method initially involves the steps of acquiring data for the current vehicle operating state for a variable control interval and storing the vehicle operating state data as measured operating state variables. Simulated vehicle operating state data is generated by inputting the measured vehicle operating state variables into a simulation model running on-board in the controller memory. The simulation model is validated for the control interval by comparing simulated vehicle response data generated by the simulation model with corresponding measured operating state variables The measured operating state data is analyzed to predict the vehicle operating state for the next control interval, and a control scheme is generated for optimizing energy management of the auxiliary power unit, the at least one energy storage device and the at least one electric drive motor for the predicted operating state by running the simulation model through various iterations and monitoring the simulated vehicle response data to select the optimal control scheme for the next control interval. Finally, the auxiliary power unit, the at least one energy store device and the at least one electric drive motor are controlled through the controller according to the optimal control scheme for the next control interval. The control method of the present invention adapts to changing driving conditions and component parameter changes.

12 Claims, 10 Drawing Sheets

METHOD AND APPARATUS FOR ADAPTIVE HYBRID VEHICLE CONTROL

FIELD OF THE INVENTION

The present invention relays to hybrid electric vehicles and more specifically to an energy management system for such vehicles.

BACKGROUND OF THE INVENTION

Hybrid vehicles generally have an electric drive train, an electrochemical battery as an energy storage device and an internal combustion (IC) engine. Series hybrid vehicles have no mechanical connection between the internal combustion engine and the drive train whereas parallel hybrid systems do have a mechanical cling.

Energy Management Concept and Objectives

The key difference between conventional vehicles, which generally rely solely on an internal combustion engine connected to a drive in for motive power, and hybrid vehicles is that the hybrid vehicles offer a virtually unlimited number of system configurations characterised by their energy flow patterns. The overall efficiency of a conventional vehicle is determined primarily by the combined efficiency of its components. The overall efficiency of a hybrid vehicle is determined by its configuration and the utilisation of the components. For instance, the operation of a hybrid vehicle with an undersized auxiliary power unit (APU) on a highway will result in a much higher energy use and lower efficiency than for a vehicle with a larger APU as the balance of the traction power must come from the battery and be later replenished. On the other hand, an oversized APU in a low speed operation will cause battery overcharging leading to frequent engine restarts. Due to the wide range of road loads encountered by a hybrid vehicle in normal operation, the objective of maximising energy efficiency cannot be achieved with a rigid system designed for average operating conditions. Energy management is a key element to ensure that the vehicle energy resources are utilised in a most effective manner.

The objectives of the energy management system is to minimise the energy consumption and emissions while reducing the component load. In a most common hybrid system configuration, consisting of an IC engine-based Auxiliary Power Unit (APU) and an electrochemical battery the objective is to operate the engine as close as possible to its maximum efficiency point, while eliminating the transients, and to use the battery to supply the power boost during acceleration, hill climbing and other high load driving modes. Since the road load varies widely during the duty cycle, the energy management system must adjust the energy flow to satisfy the road load demand and maintain the battery stale of charge.

Thermostatic (On-Off) Strategy

Early hybrid electric vehicles employed a thermostatic or on-off energy flow control strategy. The concept was based on switching the generator set on when the battery state of charge dropped below a prescribed level and off when the upper allowable state of charge level was exceeded.

The main disadvantage of the above approach is that the battery must be rather large to provide the capability of operating in the electric mode for extended periods of time, often at high loads. In order to provide a reasonable frequency of the engine cycling, the operating range of the battery state-of-charge has to be relatively wide, which results in a high overall energy loss due to the large amount of energy flowing through the battery. The losses are compounded by the fact that the battery discharge rates in the electric mode are higher than in hybrid mode. The need to recharge the battery from a deeper state of discharge in a reasonable time requires also higher charging rates. There is also an issue of the thermal balance of the battery where the large amount of energy dissipated in the battery may lead to battery overheating and loss of functionality of the system.

Load Following Strategy

The second generation of hybrid vehicles addressed the above problems by utilising a load-following control strategy where the auxiliary power unit output is controlled in response to the battery state-of-charge change. In such systems, the battery state-of-charge remains within a narrow range defined as optimum for the given battery type. The load-following approach reduces the energy exchanged with the battery and improves the overall efficiency of the system. However, since the APU operation is not directly correlated with the road load demand, the APU operation occurs at random and, in cases when the APU output does reflect the road load demand, the battery is discharged and charged at high rate, incurring excessive energy losses.

Adaptive Strategy

The ultimate form of hybrid vehicle energy management is an adaptive system where the energy flow is always in balance with the road load demand to ensure minimum energy use, minimum emission and the lowest possible component load at all times. In the ideal implementation, the power split between the battery and the auxiliary power unit is set in such a way that the total energy supplied by the battery and the auxiliary power unit to the wheels is always minimum for any finite time period. That means that the output of the auxiliary power unit must be varied to correspond with the general load pattern and the battery must be used only for a short duration power boost. A typical road load profile consists of a number of cycles that include an initial acceleration phase, cruising phase including one or several sections at approximately constant speeds, separated by short periods of acceleration or deceleration, and the final phase of deceleration to stop. Ideally, the system energy balance on each of such cycles would be such that the battery state of charge at the end of the cycle would be equal to that at the beginning of the cycle. However, this approach is not practical as some of these cycles are very short compared to the time constants of the hybrid drive train components. A finite time period must be used which would allow the system to respond to the read load demand in quasi-steady state manner.

Related Patent Discussion

The inventors are aware of prior patents directed to hybrid electric vehicles where energy management is addressed. Specifically, the energy management in this context is defined as controlling tee battery state of charge.

Early patents such as U.S. Pat. No. 4,187,436 to Etienne issued on Feb. 5, 1980 proposed hardware-based solutions to control the battery state of charge by switching the generator on and off. With tie development of the microprocessor technology in the 1980s, the focus shifted to software-based control systems relying on a microprocessor to implement the control strategy.

In the 1990s, a number of patents were issued that addressed the load-following approach. Two Ford patents, U.S. Pat. No. 5,264,764 to Kuang issued on Nov. 23, 1993 and U.S. Pat. No. 5,318,142 to Bates issued on Jun. 7, 1994, proposed a systems that numerically integrated the battery current and voltage to determine the required auxiliary power unit output. Toyota's U.S. Pat. No. 5,550,445 to Nii issued on Aug. 27, 1996 described a load-following systems where the engine is activated when a heavy motor load is detected to prevent an excessive battery discharge and shut down at low load to prevent the battery overcharging Another patent by Nii (U.S. Pat. No. 5,650,931 issued Jul. 22, 1997), proposed a system that analysed the vehicle's past power demand history and adjusted the generator output in accordance with the most frequent power value. A third patent by Nii (U.S. Pat. No. 5,698,955 issued Dec. 16, 1997) described a system to control the power in series hybrid vehicles where the power demand determined from the analysis of previous time intervals was corrected by several factors such as motor acceleration, battery state of charge trends etc. to reduce the control delay. A fourth patent by Nii (U.S. Pat. No. 5,804,947 issued Sep. 8, 1998) described a similar control system that used battery current rather than the dc link power for determining the power demand. U.S. Pat. No. 5,786,640 to Sakai issued on Jul. 28, 1998 and assigned to Nippon Soken proposed a fuzzy logic approach to improve the control of the battery state of charge within the prescribed limits. Nippon Soken's more recent U.S. Pat. No. 5,939,794 issued Aug. 17, 1999 describes a system that identifies a most statistically probable power demand and switches between four predefined control strategies depending on the power demand level.

All the above systems address primarily series hybrid configurations although some of the authors indicate that their inventions are also applicable to parallel hybrids. Although it is true in principle, the described systems are not particularly suitable for parallel systems as the battery load in a parallel system is a function of not only the motor load but also the mechanical portion of the engine output. The above patents do not disclose any specific parallel system embodiments. The key concept in all the above methods is to adjust the generator output to maintain the battery state of charge within a narrow range without specifically addressing the energy flow optimisation in their system. The approach uses inverter input analysis to predict the trend in energy consumption and appropriately increase or decrease the generator output to maintain the battery charge. The battery or engine efficiency is not directly addressed in the proposed systems.

In late 1990s, the focus of the hybrid vehicle development shifted towards parallel systems and more advanced energy management strategies. In U.S. Pat. No. 5,656,921 to Farrall issued on Aug. 12, 1997 and assigned to Rover, them is described an adaptive control system for electric hybrid vehicle uses a performance function relating the engine and motor share of the power to the battery current and fuel flow. Various combinations of the input parameters and respective performance functions are stored in the controller memory and the algorithm interpolates between the maps using fuzzy logic to find the combination with the highest value of the performance function. The system has also a capability of measuring the error between the computed and measured values of the performance function and update the stored maps to achieve a better correlation. This feature addresses the variability of component characteristics, particularly the battery that is quite sensitive to temperature, age etc. A similar approach was described in U.S. Pat. No. 5,788,004 to Friedmann issued Aug. 4, 1998 and assigned to BMW. The system assumed three levels of engine output and calculated the efficiency of each option for given driving conditions using stored component characteristics. The engine output was subsequently adjusted to reflect the most efficient option.

A method to implement adoptive cool was disclosed in commonly owned U.S. Pat. No. 5,898,282 issued Apr. 27, 1999 to Drozdz et al and assigned to BC Research Inc. The claims relate to a self-optimising system where the auxiliary Power Unit output is controlled based on the on-board statistical analysis of road load data sampled for finite time intervals. The claims included also the thermal behaviour of the battery as a energy management control variable. U.S. Pat. No. 5,820,172 to Brigham et al. issued on Oct. 13, 1998 and assigned to Ford proposed a method of adaptive control of a hybrid system by analysis of possible combinations of the battery and engine output during a finite control period to determine the most fuel efficient option for assumed system load. The method used the measured battery load in a preceding control period as a battery load for the analysed control period and was based on predetermined set of battery discharge-engine output combinations.

SUMMARY OF THE INVENTION

The present invention is directed to a method and a system to implement adaptive energy management in a series or parallel hybrid vehicle. The system minimises the energy consumption and emissions and reduces loads on the components, thereby improving their reliability and overall durability. The stem is designed to be implemented in a hybrid electric vehicle that includes a digital control system, preferably based on a distributed network principle with multiplexing capabilities.

The present invention is a continuation and refinement of the approach outlined in U.S. Pat. No. 5,898,282 and addresses adaptive system control, both in the context of a series and parallel hybrid architecture. The method of the present invention relies on the control system adapting to the driving conditions and component parameter changes. In the approach of the present invention, the performance of the entire system is analysed on board the vehicle in real time by performing a simulation of the system using the actual operating data. The other systems described above rely on pre-programmed sets of data developed for assumed typical duty cycles. In the novel approach of the present invention, the control strategy is not pre-determined. The control program contains a detailed mathematical model of each major component of the vehicle and a definition of how the components interact. The control algorithm analyses the system performance under current driving conditions and makes a decision on the optimum energy flow pattern between the engine, battery and the motor. This approach includes all key features of the above-mentioned prior art systems such as duty cycle pattern recognition, energy efficiency optimisation, adaptation to the environmental conditions and component characteristics, and offers other benefits such as flexibility in handling complex systems difficult to represent with maps and assessment of the component condition.

Key Features

The key feature of the disclosed method is that the analysis and optimisation of the energy flow between the major components of the drive train is performed by means of on-board simulation of the vehicle performance for predicted driving cycle. The method includes a set of tools to analyse and predict driving patterns. The control strategy is dynamically modified to account for the variations in duty cycle. Another important feature of the method is the capability of detecting changes in component characteristics due to ageing, environmental factors, malfunctions etc. and adapting the control strategy to the system state changes. The method is applicable to both series and parallel hybrid systems. Either internal or external combustion engine or a fuel cell can be used as a prime mover in a series system. The parallel system may include an IC engine and one or more electric machines coupled via a planetary gearbox and/or a continuously variable transmission (CVT).

Accordingly, the present invention provides a method for controlling a hybrid vehicle having an auxiliary power unit, at least one energy storage device, at least one electric drive motor for traction, and a controller with associated memory comprising the steps of:

acquiring data for the current vehicle operating state for a variable control interval;

storing the vehicle operating state data as measured operating state variables;

generating simulated vehicle operating state data by inputting the measured vehicle operating state variables into a simulation model running-on-board in the controller memory;

periodically validating the simulation model for the control interval by comparing simulated vehicle response data generated by the simulation model with corresponding measured operating state variables;

analysing the measured operating state data to predict the vehicle operating state for the next control interval;

generating a control scheme for optimizing energy management of the auxiliary power unit, the at least one energy storage device and the at least one electric drive motor for the predicted operating state by running the simulation model through various iterations and monitoring the simulated vehicle response data to select the optimal control scheme for the next control interval; and controlling the auxiliary power unit, the at least one energy storage device and the at least one electric drive motor through the controller according to the optimal control scheme for the next control interval.

In a further aspect the present invention provides a control system for a hybrid vehicle having an auxiliary power unit, at least one energy storage device and at least one electric drive motor for traction, the control system comprising:

means for acquiring data for the current vehicle operating state for a variable control interval;

means for storing the vehicle operating state data as measured operating state variables;

a simulation model for generating simulated vehicle operating state data by inputting the measured vehicle operating state variables, the simulation model being validated for the control interval by comparing simulated vehicle response data generated by the simulation model with corresponding measured operating state variables;

means for analysing the measured operating state data to predict the vehicle operating state for the next control interval;

the simulation model being used to generate a control scheme for optimizing energy management of the auxiliary power unit, the at last one energy storage device and the at least one electric drive motor for the predicted operating state by running the simulation model through various iterations and monitoring the simulated vehicle response data to select the optimal control scheme for the next control interval; and a controller for controlling the auxiliary power unit, the at least one energy storage device and the at least one electric drive motor according to the optimal control scheme generated for the next control interval.

The above described method and apparatus for optimising the energy flow for the series hybrid system is in principle applicable to any hybrid propulsion combining multiple energy sources. Specifically, for the hybridised fuel cell systems, the energy management approach is similar to that described for the series system with an IC engine/generator. As for the series system with an IC engine, the controlled variable is the output of the auxiliary power unit. The only significant difference is the mathematical model of the power unit and the optimisation constraints reflecting the operating characteristics of a fuel cell.

In a parallel system with a Continuously Variable Transmission (CVT), the same approach can be used as the auxiliary power can be operated at constant speed and load. The controlled variable is the output from the IC engine and the battery load is determined by the traction motor power demand. In a parallel system without a Continuously Variable Transmission (CVT), the general approach is the same, however, in addition to the engine output, the motor output is also a controlled variable. The optimisation addresses the ratio of the engine torque to motor torque that minimises energy consumption and emissions.

BRIEF DESCRIPTION OF THE DRAWINGS

Aspects of the present invention are illustrated, merely by way of example, in the accompanying drawings in which.

DETAILED DESCRIPTION OF THE PREFERRED EMBODIMENTS

Hybrid System Description

Figure 1:
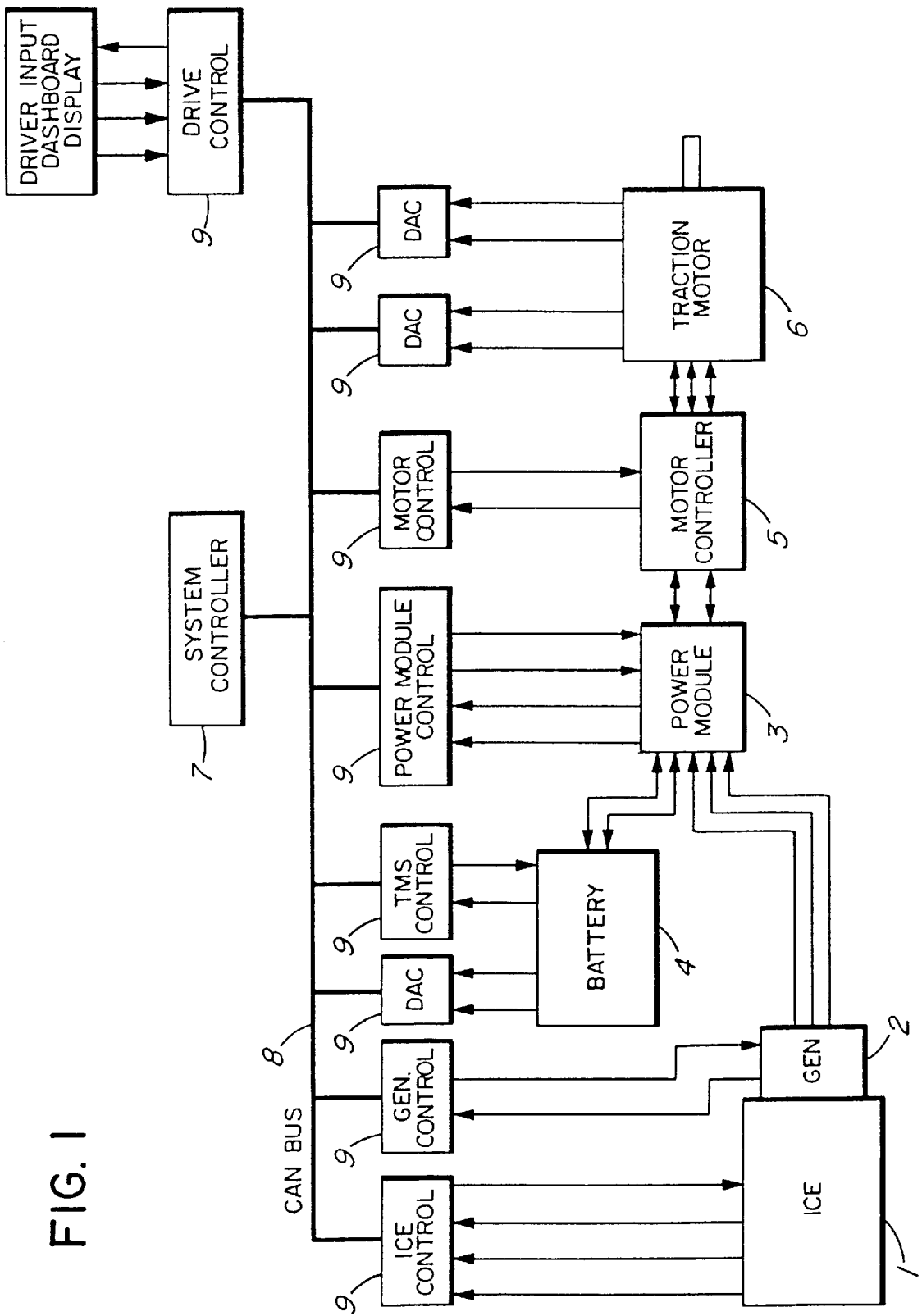
FIG. 1 is a schematic diagram of a series hybrid electric vehicle according to one embodiment of the present invention.

FIG. 1 presents a schematic representation of a control system for a series hybrid electric vehicle according to a preferred embodiment of the present invention. To demonstrate the adaptive control method, a series system with an AC auxiliary power system is shown. However, a DC auxiliary power system based on a DC generator set or a fuel cell can be controlled using the same principle. In the system shown in FIG. 1, an into combustion engine 1 drives AC generator 2 The output of the generator 2 is sent to a power module 3 that converts the ac power into a dc signal. The power nodule voltage and current limits are controlled to effectively achieve an adjustable dc current source. The output of the power module 3 is connected in parallel with the battery 4 and the traction motor controller 5. Motor controller 5 supplies a drive signal to the traction motor 6. The control system consists of a system master controller 7 and a network of microcontrollers 9 performing data acquisition and driving the control devices. The analysis, optimisation and energy management tasks are performed by system master controller 7 integrated with the vehicle control network via a serial communication interface (data bus) 8.

Figure 2:
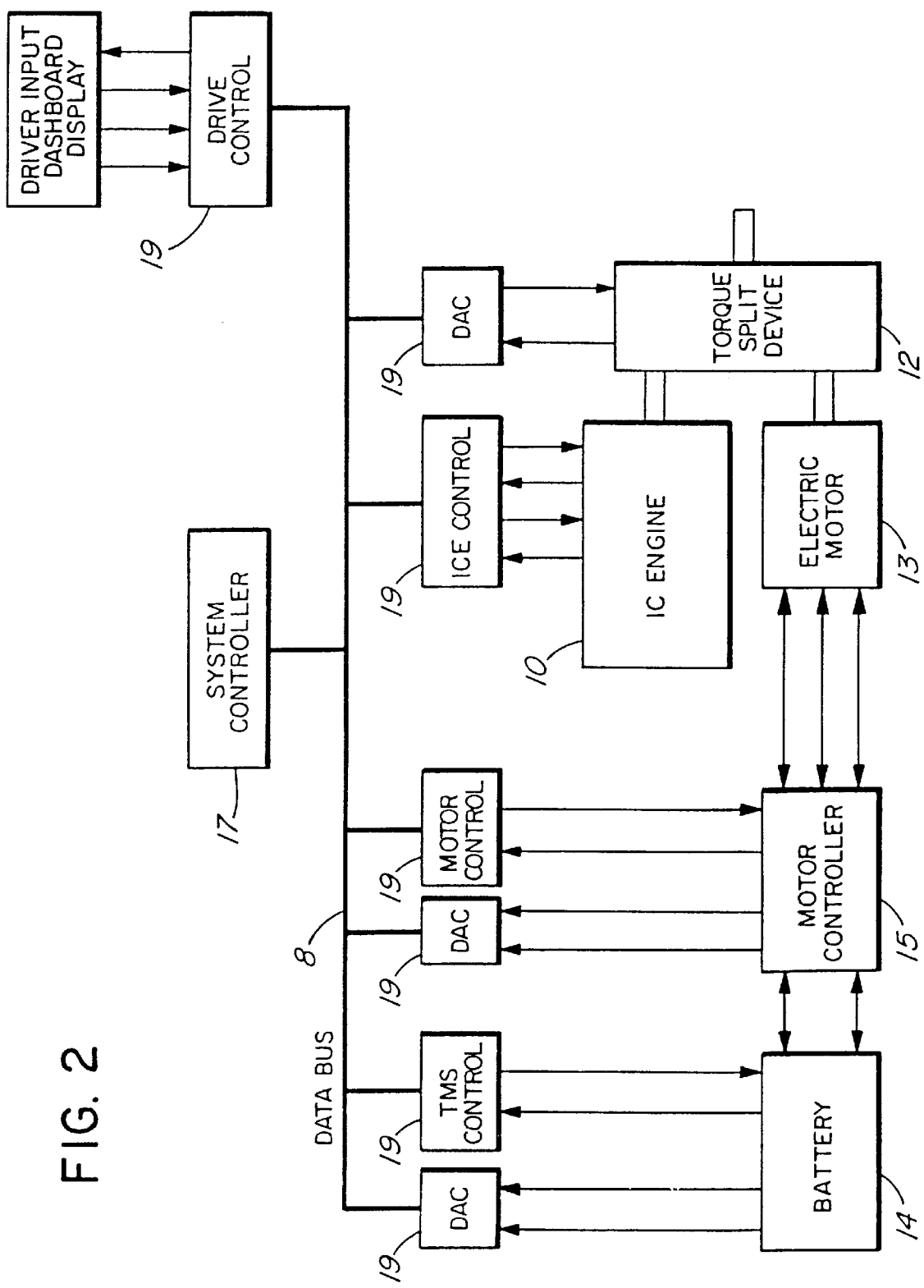
FIG. 2 is a schematic diagram of a parallel hybrid electric vehicle according to a second embodiment of the present invention.

FIG. 2 shows a schematic representation of a parallel hybrid drive train and its control system. The IC engine 10 is coupled through a torque-split device 12 (planetary gear box) with an electric motor 13. The output from the torque-split device 12 is used to dive the wheels. The electric motor is connected to a battery 14 via a motor controller 15. The motor can operate as a generator during regenerative braking and low power driving modes and the generated energy is used to charge the battery 14. The control system consists of a main vehicle controller 17 and a number of device controllers 19 integrated via a digital network. The energy management is achieved by controlling the operating points of the engine and the motor in response to the driver demand determined by the position of the acceleration and brake pedals.

Operation

Figure 3:
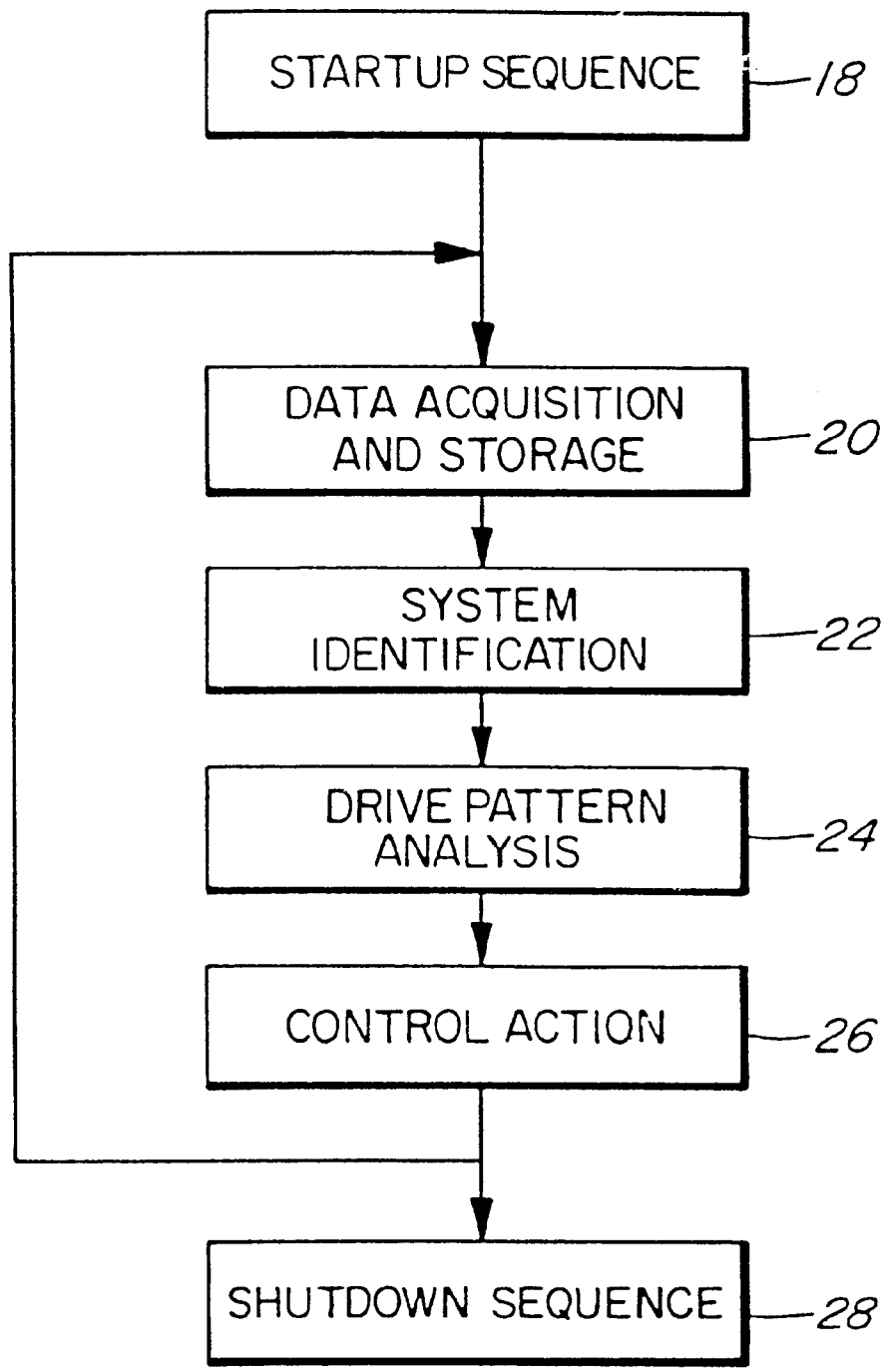
FIG. 3 is a flow chart showing the overall steps of the adaptive energy management system method of the present invention.

The control strategy is implemented at finite time intervals. The system controller 7 or 17 evaluates the vehicle performance during the past control intervals and attempts to predict the best control strategy for current interval. The process is continuously repeated allowing the system to learn the most efficient control strategy. The general algorithm of the method is shown in FIG. 3. The control cycle comprises the major steps of data acquisition and storage 20, control model validation via system identification 22, optimisation of energy flow based on measured data via a drive pattern analysis step 24, and implementation of the optimal solution via a control action step 26. For simplicity, FIG. 3 presents the tasks in sequential order. However, these steps can be executed both sequentially and concurrently, with a concurrent method being a preferred option. If computational capabilities of the controller are sufficient, the tasks of data analysis ad model validation during system identification 22 can be performed in parallel. Startup and shutdown steps 18 and 28, respectively, are also provided to handle stating and stopping of the control cycle.

FIGS. 4–9 present general algorithms for the above major control step

Startup Sequence

Figure 4:
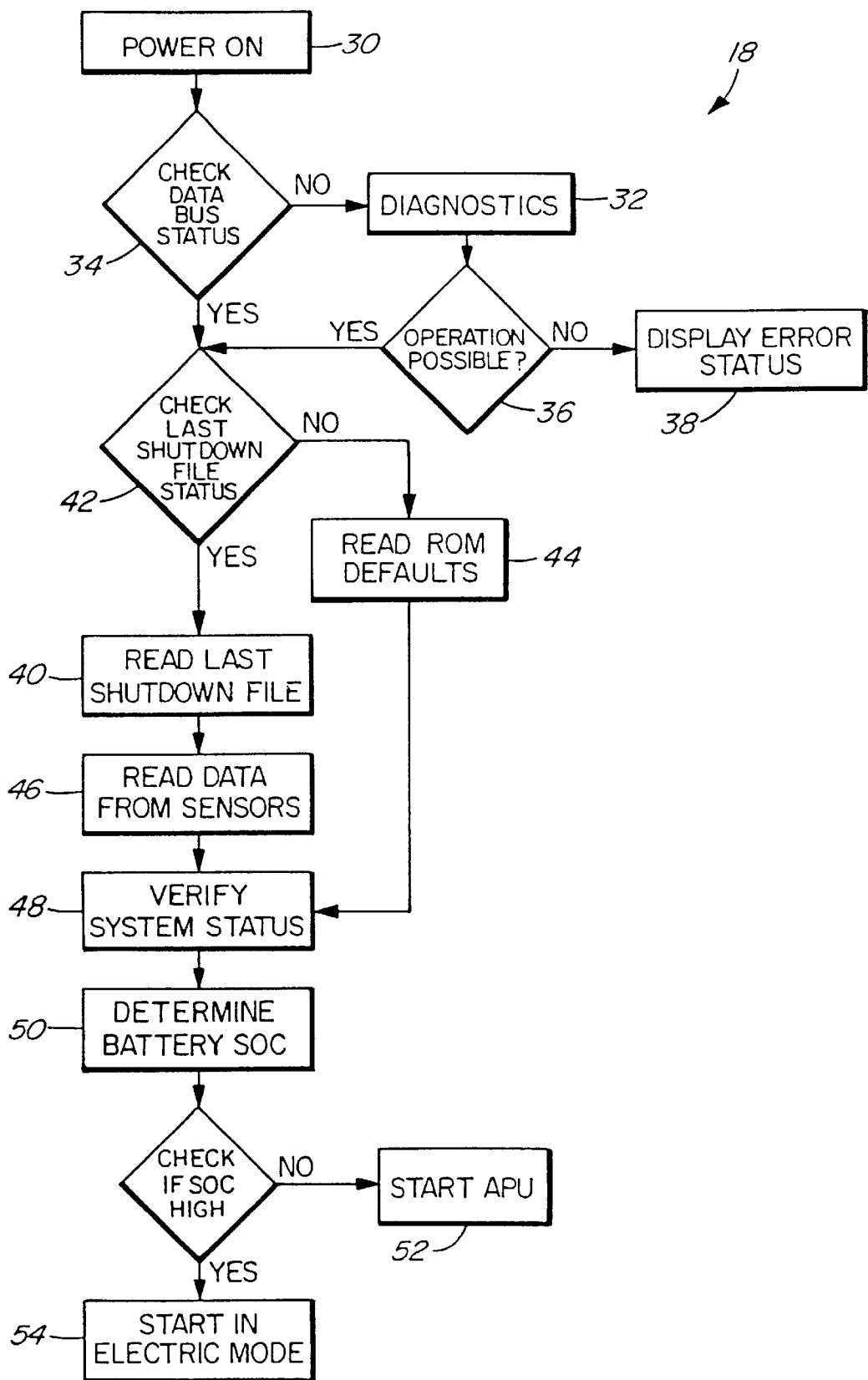
FIG. 4 is a flow chart showing the steps of the startup sequence.

In the initial startup step 18 shown in FIG. 4, immediately after powering up at 30, the controller performs a set of self-diagnostic task 32 to determine the condition of the control system. The typical tasks include verification of the data bus status 34 and the condition of all network nodes. If any of the tests fails, the system evaluates the severity of the malfunction at step 36 and decides if a limited mode of operation is possible. If not, the system is shut down and error message describing the problem is displayed at step 38. The above is usually specific for the hardware and communication protocol.

Following the control system check, the controller evaluates the state of the system. System status data recorded after the last system shutdown is loaded into the memory and used as initial conditions in step 40. The status data are valid if the last shutdown procedure was fully completed, which is determined by the value of the last shutdown status flag in step 42. If the last shutdown status flag indicates shutdown ear, a default set of system data is loaded from a non-volatile memory and used as initial conditions as shown in step 44.

In the next step 46, the controller queries the network to obtain the values of the system parameters and evaluates if they are within acceptable limits in step 48. If any of the sensor readings is not acceptable, the controller displays the warning on the user interface and decides if the operation is possible. Following the system check, the controller evaluates the battery state-of-charge in step 50 based on voltage and temperature data in correlation with the last shutdown record. If the battery state-of-charge (SOC) is below a prescribed level, the controller starts the Auxiliary Power Unit (APU) immediately to recharge the battery as shown in step 52. Conversely, if the battery state-of-charge is above a prescribed level, the controller runs the vehicle in electric mode to lower the charge level as shown in step 54. If the battery state-of-charge is within the prescribed operating limits, the controller waits until the accelerator pedal is depressed before activating the Auxiliary Power Unit. After system restart, the Auxiliary Power Unit is always activated at a most efficient operating point until the system collects sufficient amount of data to determine a more efficient configuration.

The above start-up procedure 18, including the control system verification and drive train status check, will typically last 10–15 seconds, which is comparable to modem conventional vehicles.

Data Acquisition

Following the start-up procedure, the main controller begins to collect data from the network sensors at constant sampling rate, typically not exceeding one second. Alternatively, the data are acquired and stored by the device level controllers 9 or 19 and the contents of the local memory buffers is transferred to the main controller 7 or 17 when the buffers are full.

Figure 5:
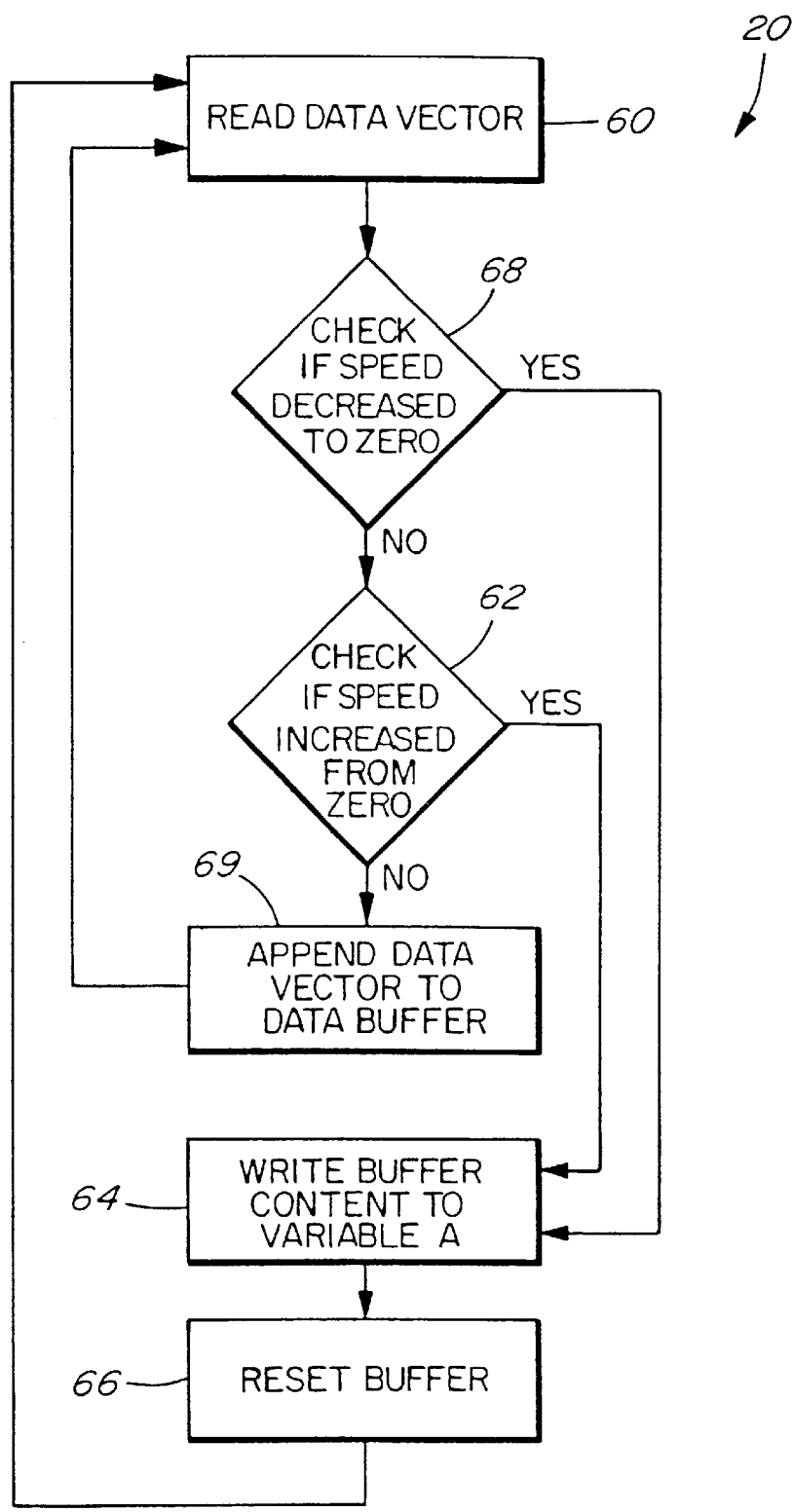
FIG. 5 is a flow chart showing the data acquisition process steps according to the method of the present invention.

The algorithm of the data acquisition process and storage process 20 is shown in FIG. 5. The data is assembled into vectors and written as rows of a matrix where the first column is timer output. The data is stored in at least two buffers: one short (5–10s) buffer used to evaluate instantaneous state of the system, and one long buffer used to determine road load patterns. The length of the long buffer is generally determined by analysis of the drive pattern and corresponds to the time interval that results in best correlation between the predicted pattern and the actual measured data.

In some cases, it may be advantageous that the length of the long buffer corresponds to the length of the individual drive segments. The controller checks the current value of vehicle speed and the reads the contents of the short-term buffer as shown in step 60 to detect the beginning and end of a drive cycle segment. If a vehicle speed increase from zero is detected, a new drive cycle segment is initialised as shown in step 62 by writing the previous buffer contents to matrix variable A and resetting the buffer as shown in steps 64 and 66. In a similar manner, if a speed decrease to zero is detected as shown in step 68, a stopped segment is initialised. If vehicle speed remains constant, the data is appended to the data buffer as shown in step 69. Every time a segment is initialised, the contents of the buffer is written to memory as Marc variable A tat is available for processing for other modules.

System Identification

Figure 6:
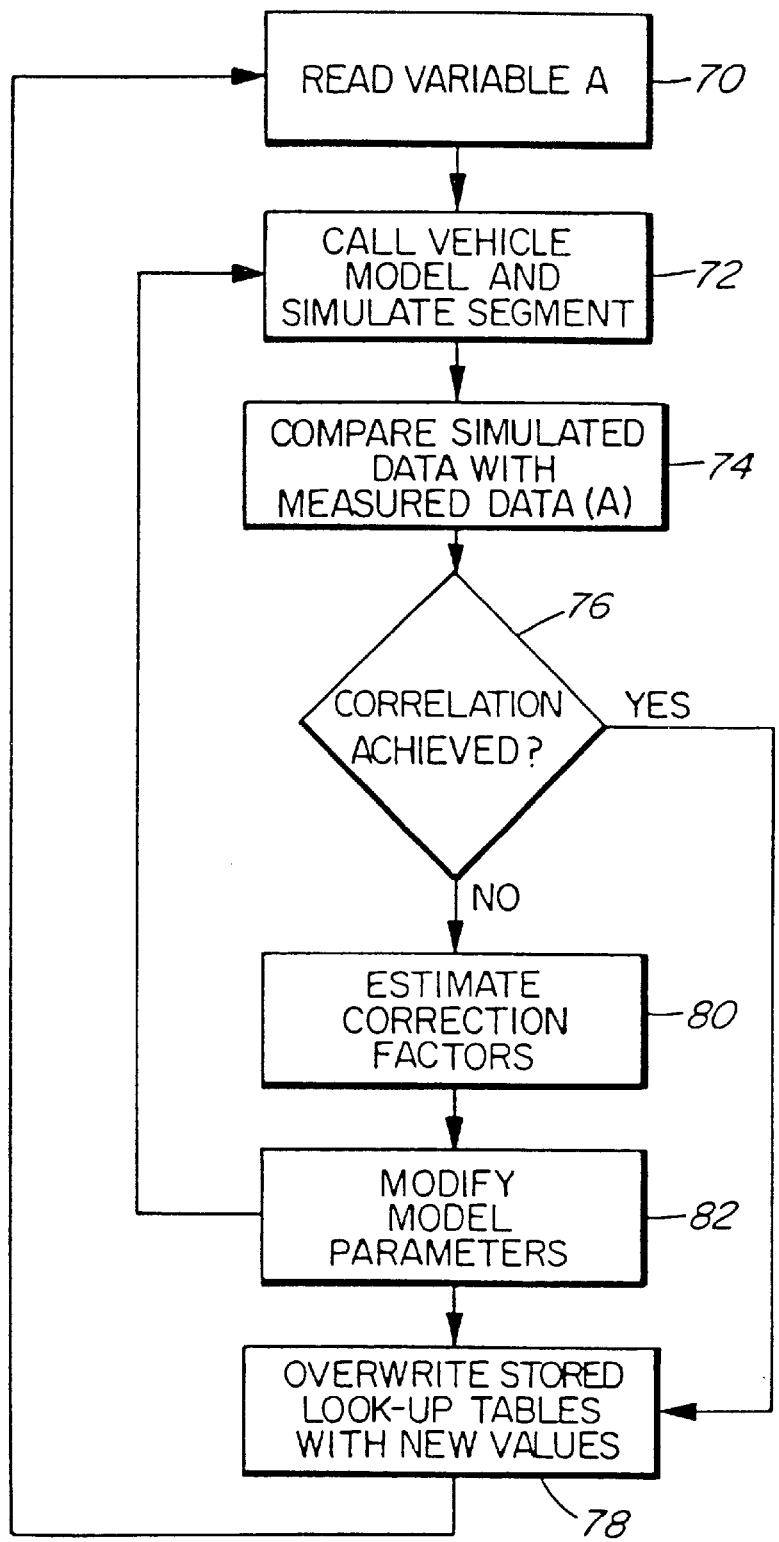
FIG. 6 is a flow chart showing the system identification process steps.

The next task within the control period is the system identification process 22 (FIG. 6). The objective of this process is to the at the mathematical model of the vehicle is representative of the current sate of the system. It is well understood that the component characteristics, particularly those of the electrochemical battery 4 or 14, are sensitive to temperature, ageing, operating history etc. The system identification routine identifies current system parameters and updates the model running in the controller 7 or 17. In the initial step 70, the matrix variable A representing the most recent duty cycle segment is read by the subroutine and formatted to provide an input for simulation.

Figure 7:
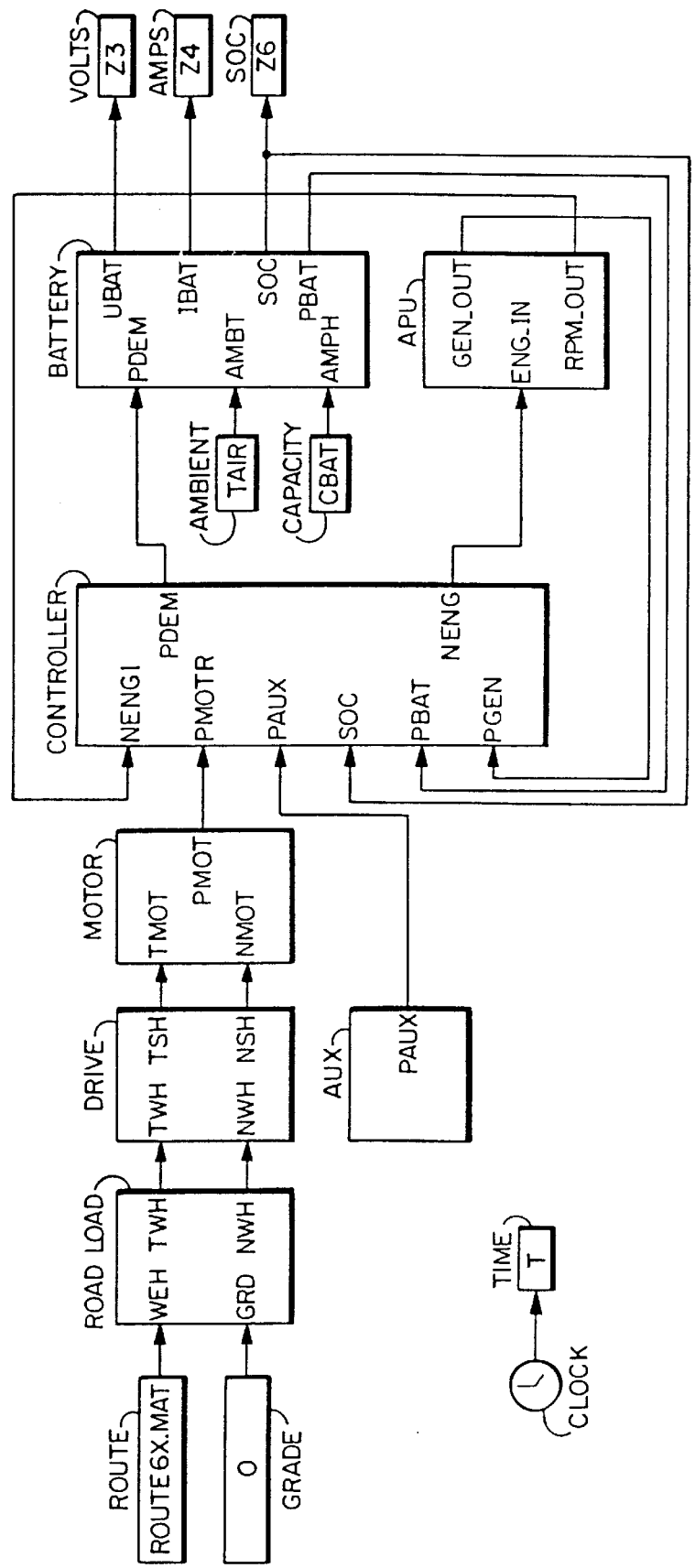
FIG. 7 is a schematic diagram of an example mathematical model of the entire drive train for calculating engine fuel and battery energy consumption.

The control software includes an embedded mathematical model of the entire drive train. The model is preferably a subroutine or object capable of calculating the engine fuel and battery energy consumption as well as simulate battery behaviour. Preferably, it is a model developed using simulation software such as Simulink (trademark) and converted into an executable subroutine. An example of such a simulation model is shown in FIG. 7. The model includes mathematical representation of the road load, accessory load, drive train, traction motor, battery, auxiliary power unit and the system controller. The model uses experimentally verified component characteristics in the foil of look up tables. The lookup tables are updated by values based on measured data during the system identification process at step 78 in FIG. 6. The inputs to the model are the vehicle speed and road incline recorded during previous control intervals. From the input data, the model calculates the road load and subsequently the torque demand and rotational speed of the traction motor and the overall energy losses in the drive train. Based on the calculated motor output, the model estimates the electric power demand imposed by the motor on the battery and the auxiliary power unit. The controller module implements the control strategy, combining the outputs of the battery and the auxiliary power unit. The model shown calculates the battery voltage, current and state of charge, as well as engine fuel consumption and emissions. The model illustrates a general approach to on-board simulation and optimisation of the energy flow. Depending on the application, the model can include additional components and output capabilities.

In the system identification process, system state variables such as wheel speed, drive shaft torque, engine rpm and engine manifold pressure, measured in the preceding control period, are used as the input to the simulation model and the response of the system is simulated as shown in step 72. The simulated response such as current and voltage on battery terminals, input to the inverter and output of the power unit are compared to the measured data in step 74 to determine if correlation according to pre-define conditions is achieved as shown in step 76. If the correlation satisfies the pre-defined conditions, the model is assumed to be accurate and the program control is returned to the main program as shown in step 78.

If the correlation is not satisfactory, the model must be corrected. A variety of mathematical techniques can be used to achieve the correlation. Preferably, the steps include estimating the correction factors 80 and then modify 82 the model parameters accordingly. A simple method of model updating can be an iterative procedure where the component look up tables are modified by a correction factor proportional to the error between the simulated and measured response. A least square method can be used to quantify the error. The system is modified it a satisfactory model accuracy is achieved based on the simulated response data being substantially in agreement with the measured data.

At the end of the system identification process 22, Me stored model look up tables are overwritten by the updated model values as shown in step 78. In this way, the model always represents the actual state of the system and the deterioration or malfunction effects should be easily detected. This process is performed continuously during the vehicle operation but it is not necessary that the model is updated at the same frequency as the control strategy. By nature, deterioration processes and environmental factors occur at low rates so in most cases it is satisfactory to perform the mode validation routine every several control periods, possibly when the computational requirements of the controller are low, for instance during extended stops.

Drive Pattern Analysis

The objective of the drive pattern analysis process 24 is to evaluate the vehicle operating pattern and provide a reference database for the active control algorithm. The time intervals of the control process generally correspond to distinctly identifiable segments of the driving cycle.

Figure 8:
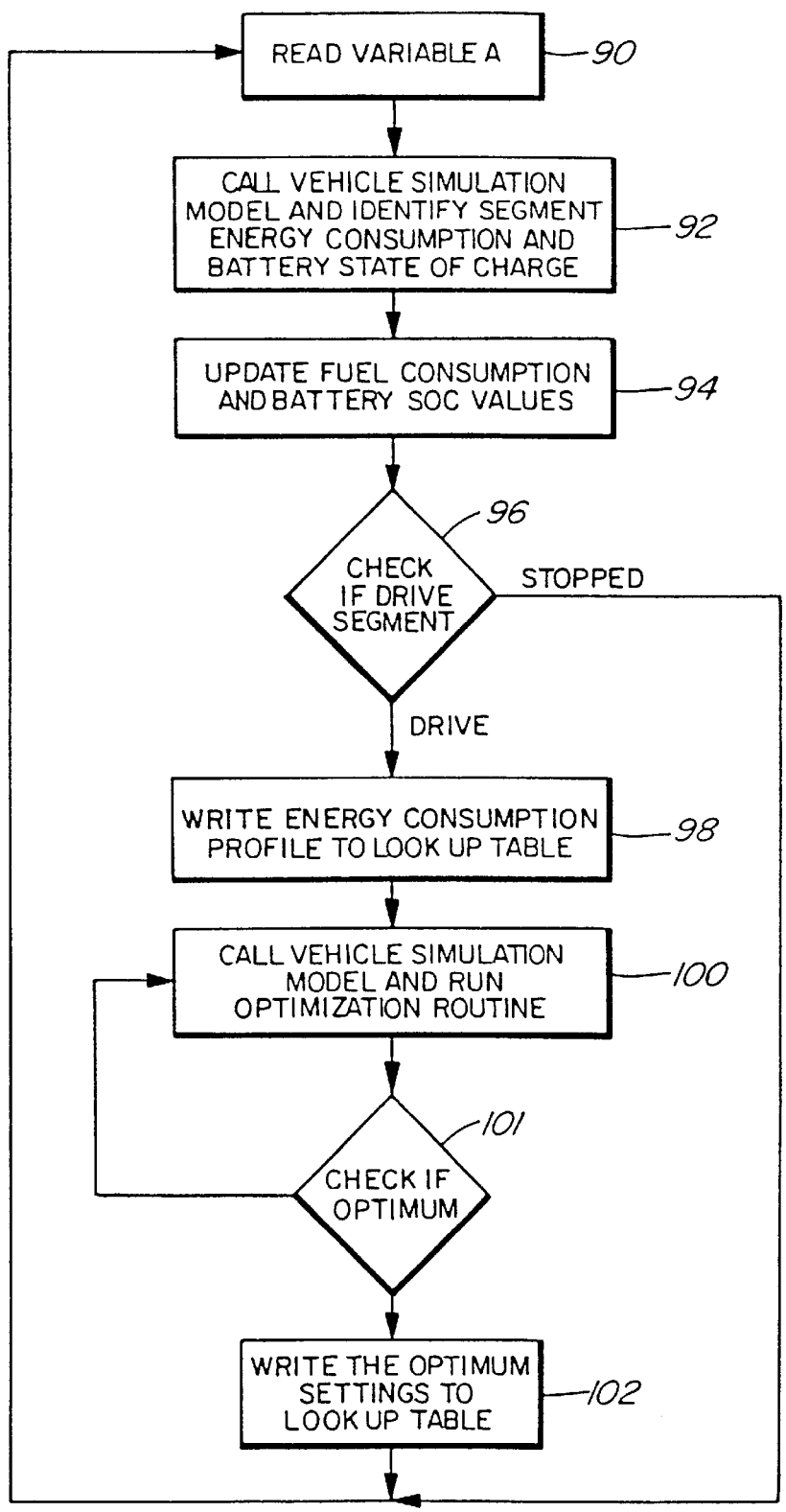
FIG. 8 is a flow chat showing the drive pattern analysis steps performed according to the method of the present invention.

As shown in FIG. 8, step 90, the process begins by reading the variable matrix A that represents the last recorded data buffer. The program formats to data for simulation input. The measured data is fed into the simulation model in step 92 which calculates the battery state of charge, auxiliary power unit energy consumption and generates and energy consumption profile averaging the motor power consumption within short time intervals (typically 5 seconds). The simulation data is written to global variables available for other modules in step 94. In the process steps set out in FIG. 8, the state of the vehicle is checked at step 96 to determine if the vehicle is being driven or is stopped. If the analysed segment is one in which the car is in drive mode, the energy consumption profile is appended to the database table containing the profiles of past drive cycles as shown in step 98. The table is used by the adaptive control algorithm to identify the control strategy for the current profile.

The next step in the analysis of the segment is optimisation of energy use for the segment. As shown in step 100, the simulation model is called and analysed with increasing levels of APU output. The simulated output is checked to determine if an optimal result has been achieved as shown in step 101. Preferably, an optimal result is when the battery state of charge at the end of the segment equals the initial state of charge. The simplest optimisation is performed by sweeping one or more system state variables within the allowable range and monitoring the system response. For instance, in the case of a series hybrid system shown in FIG. 1, the engine output is varied and corresponding values of fuel consumption, emissions and battery state of charge and temperature are calculated. If at any time during the simulated period, any of the state variables is outside the allowable range, the option is rejected and simulation continues with new set of state variables. For instance, if the simulation results indicate that maintaining a certain APU level would cause battery overheating, the APU output is reduced until the thermal balance is achieved. Upon completion of simulation, an option with a minimum fuel consumption and emissions is selected. Depending on the application, the optimised auxiliary power profile can be used directly to perform the control action for the next control cycle or can be stored for reference for optimisation of future cycles. In the latter case, the identified optimum auxiliary power profile is appended to the database table containing the profiles of past drive cycles as shown in step 102.

In the case of a parallel system shown in FIG. 2, the control program divides the segment into sections of acceleration, coasting, cruising and regenerative braking and generates a torque split profile for the segment. The torque split profile is a signal that drives the torque split device by prescribing the torque share of the motor and the engine at any given time point of the predicted duty cycle. The initial torque split profile uses look-up tables defining the most efficient power split profile for the typical events— acceleration, cruising, coasting and deceleration. Each event has a separate look up table established during development and the program switches between the tables using a set of rules to recognise the pattern. A fuzzy logic approach may be used for that purpose. Once the power split profile is generated, the system simulates vehicle performance for this cycle and calculates battery state of charge, fuel consumption emissions etc. The optimisation of energy consumption and emissions is performed by iterative simulation of the predicted cycle with modified torque split profile. The profile defined using the most efficient characteristics serves as the baseline.

The optimisation scheme assumes an optimum battery state of charge and attempts to manage the energy flow to remain within a narrow range from that condition. The program determines the battery state of charge at the beginning of the cycle and performs simulation of the predicted cycle with an objective of attaining the ideal value. The algorithm begins by simulating the system with increasing or decreasing the engine output during the cruising portions of the cycle. Subsequently, it follows by increasing the input of the engine during the acceleration and deceleration portion of the cycle. Finally it investigates a mixed solution, when both the acceleration and cruising conditions are modified. The system selects the solution that results in the desired battery state of charge at minimum fuel consumption and emissions.

The output of the optimisation routine is a set of values for selection of look up tables. For instance, if the acceleration profile for given acceleration pedal position can be defined as a look up table containing a set of curves defining the torque split ratio between the engine and the motor, the baseline curve for the most efficient option is denoted by the lowest look up table index. With an increasing index, the share of the engine would increase up to the point that at the highest index setting the motor share would be reduced to zero with the engine driving the vehicle as in conventional drive train. For cruising conditions, the selection of the engine output is performed by sending a control signal to the engine controller which in turn, uses its internal, device specific, procedure to maintain the required shaft speed and load.

Control Action

Figure 9:
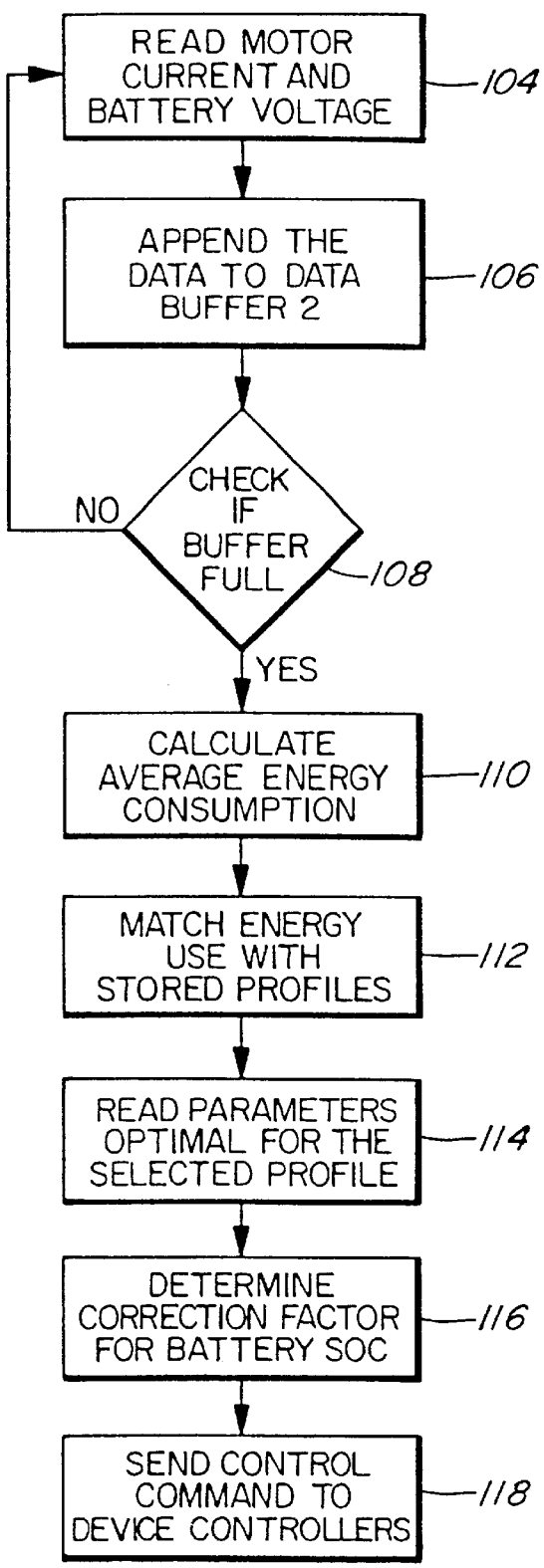
FIG. 9 is a flow chart showing the control action steps performed according to the method of the present invention.

The control action process of the present invention is shown in FIG. 9. The adaptive control module attempts to match the energy supply to instantaneous energy demand in steps 104 and 106, the process uses a short buffer (5–10 sec) to store motor current and battery voltage data and calculates an average enemy demand (step 110). If the vehicle is stopped and the energy demand is low, the controller has the capability of switching the engine off. If the new drive cycle is detected, the program tries to match the energy use profile to any of the shred optimised profiles (step 112) and adjust the auxiliary power output to reflect the optimum settings (step 114). Every time a new value of the energy demand is calculated, the program tries to find a stored profile that matches better the given profile. If it manages to find one, it adjusts the APU power to reflect the changed profile.

In the ideal situation, the controller would always select the optimum engine power level to maintain the battery state of charge within a very narrow range. However, due to unavoidable errors in predicting the energy use, the battery state of charge will fluctuate. This can be improved by correcting the calculated APU output by a correction factor determined by analysis of the battery state of charge (step 116).

In the last step of the control cycle, the reference signals are sent from the master controller to the appropriate device controllers (step 118) and the cycle is repeated.

Shutdown Sequence

Once a satisfactory correlation is achieved, all state variables are written to the non volatile memory after the model has been updated and serve as initial condition for the next restart. However, the sets of the state variables can be logged to monitor the system state changes for diagnostic purposes.

Figure 10:
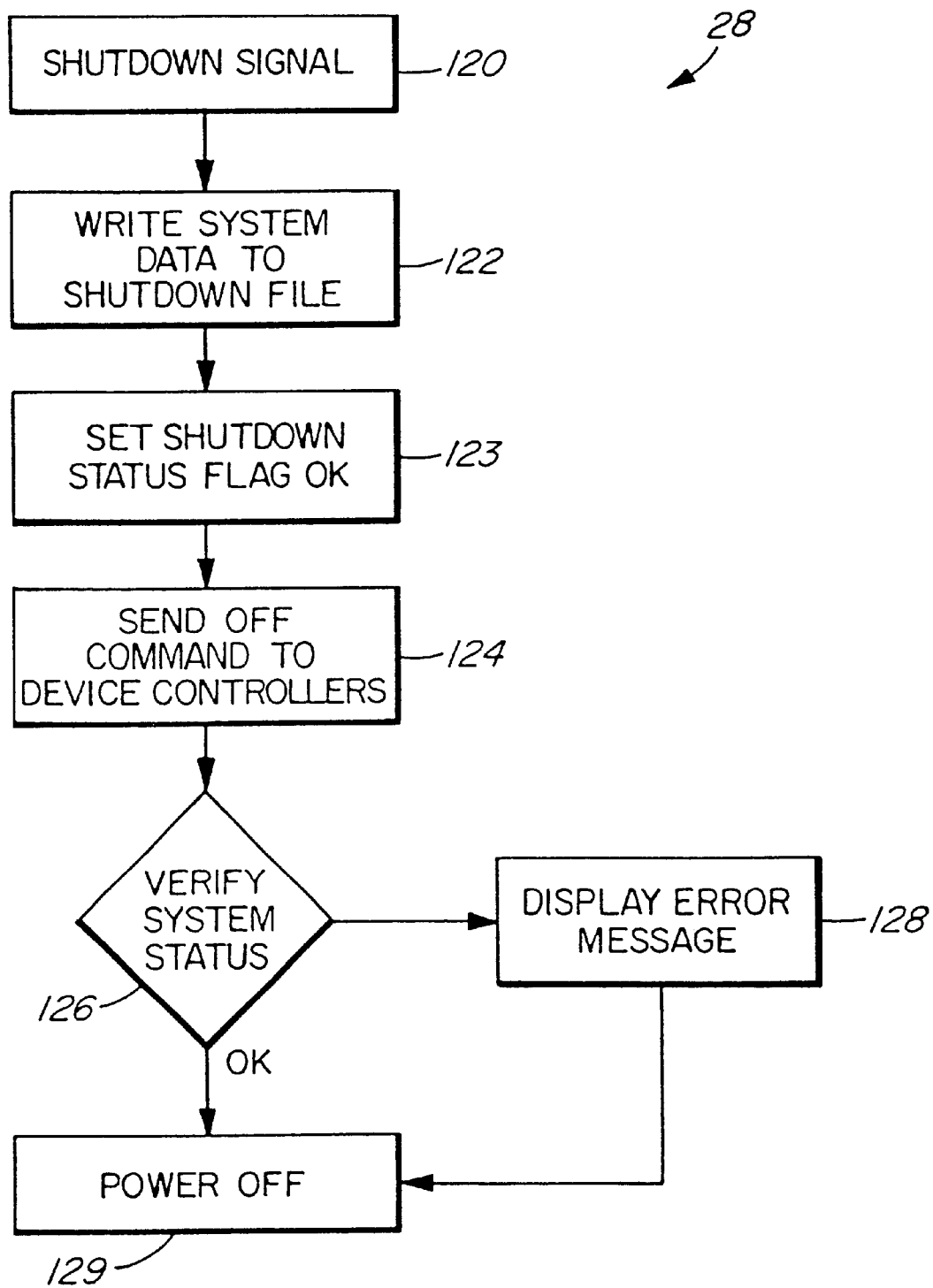
FIG. 10 is a flow chart showing the shutdown steps of method of the present invention.

The basic shutdown sequence is shown in FIG. 10. A shutdown signal 120 is sent which prompts system data to be written to a non-volatile memory, preferably a shutdown file, in step 122. Once the shutdown file is created, a shutdown status flag is set in step 123 to a value to indicate that the shutdown file can be used as initial system status data for the next startup sequence. If an error occurs in the shutdown process, the shutdown status flag is set to a different value to indicate that the shutdown file should not be used for initial system status data. An OFF command is sent to the device controllers in step 124. The status of the various system components is verified in step 126. The power is switched off in step 129 if all components successfully report completion of the status check. If errors are reported an appropriate error message is displayed in step 128 to warn the user.

I claim:

1. A method for controlling a hybrid vehicle having an auxiliary power unit, at least one energy storage device, at least one electric drive motor for traction, and a controller with associated memory comprising the steps of:

acquiring data for the current vehicle operating state for a variable control interval;

storing the vehicle operating state data as measured operating state variables;

generating simulated vehicle operating state data by inputting the measured vehicle operating state variables into a simulation model running on-board in the controller memory;

periodically validating the simulation model for the control interval by comparing simulated vehicle response data generated by the simulation model with corresponding measured operating state variables;

analysing the measured operating state data to predict the vehicle operating state for the next control interval;

generating a control scheme for optimizing energy management of the auxiliary power unit, the at least one energy storage device and the at least one electric drive motor for the predicted operating state by running the simulation model trough various iterations and monitoring the simulated vehicle response data to select the optimal control scheme for the next control interval; and controlling the auxiliary power unit, the at least one energy storage device and the at least one electric drive motor through the controller according to the optimal control scheme for the next control interval.

2. The method of claim 1 in which validating the simulation model includes the additional steps of:

modifying the simulation model; and repeating the validating of the simulation model until the simulated vehicle operating data and the stored vehicle operating state data correlate within pre-determined limits if the simulated data and the stored data do not initially correlate.

3. The method of claim 1 including the step of storing the current vehicle operating state variables to non-volatile memory at shutdown of the vehicle.

4. The method of claim 3 including an initial startup sequence comprising the steps of:

performing self-diagnostic testing of the controller, and loading into memory from non-volatile memory the vehicle operating state data from the previous shutdown to use as the current vehicle operating state data.

5. The method of claim 4 including the step of setting a control system flag to indicate if there was a shutdown error, and loading into memory default vehicle operating state data if the error flag is set from the last shutdown.

6. The method of claim 1 in which the vehicle operating state variables being acquired include wheel speed, drive shaft torque, auxiliary power unit revolutions per minute, auxiliary power unit manifold pressure, state of charge at the energy storage device, current and voltage at the energy storage device, input to the inverter and output of the auxiliary power unit.

7. The method of claim 1 in which the step of generating a control scheme for optimizing energy management includes monitoring the simulated model to select the control scheme in which the state of charge of the energy storage device at the end of a control interval equals the state of charge at the start of the interval.

8. A control system for a hybrid vehicle having an auxiliary power unit, at least one energy storage device and at least one electric drive motor for traction, the control system comprising:

means for acquiring data for the current vehicle operating state for a variable control interval;

means for storing the vehicle operating state data as measured operating state variables;

a simulation model for generating simulated vehicle operating state data by inputting the measured vehicle operating state variables, the simulation model being validated for the control interval by comparing simulated vehicle response data generated by the simulation model with corresponding measured operating state variables;

means for analysing the measured operating state data to predict the vehicle operating state for the next control interval;

the simulation model being used to generate a control scheme for optimizing energy management of the auxiliary power unit, the at least one energy storage device and the at least one electric drive motor for the predicted operating state by running the simulation model through various iterations and monitoring the simulated vehicle response data to select the optimal control scheme for the next control interval; and a controller for controlling the auxiliary power unit, the at least one energy storage device and the at least one electric drive motor according to the optimal control scheme generated for the next control interval.

9. A control system according to claim 8 wherein the auxiliary power unit is selected from a the group consisting of: internal combustion engines and fuel cells.

10. A control system according to claim 8 wherein the auxiliary power unit comprises an internal combustion engine mechanically coupled with an electric traction motor.

11. A control system according to claim 8 wherein the energy storage device is selected from the group comprising an electrochemical battery, a capacitor and a flywheel.

12. A control system according to claim 8 wherein the means for acquiring data for the current vehicle operating state comprise a plurality of networked microcontrollers associated with the each of the auxiliary power unit, the at least at one energy storage device and the at least one electric drive motor for traction.

* * * * *